Patented Nov. 28, 1933

1,937,484

UNITED STATES PATENT OFFICE 1,937,484

ARCHITECTURAL LACQUER SYSTEM

Charles Bogin, Terre Haute, Ind., assignor to Commercial Solvents Corporation, Terre Haute, Ind., a corporation of Maryland No Drawing. Application October 16, 1931
Serial No. 569,268

9 Claims. (Cl. 91—68)

The present invention relates to brushing lacquer systems for finishing architectural surfaces. More particularly, it relates to improved methods of applying brushing lacquer systems to surfaces of plaster, cement and the like.

In the past, lacquer has been recommended for architectural use due to its many advantages such as durability, quick drying, ease of cleaning, etc. However, it has not come into use to any great extent owing to frequent failures from cracking and peeling. Peeling is encountered especially if the plaster is not dry or if, after the lacquer film is dry, moisture seeps through the plaster from the other side. It has been impossible to forecast the probable success or failure of a particular lacquer system even when apparently applied under conditions identical in every respect to a previous experiment. The unsatisfactory results often obtained have therefore prevented the extensive use of such coating systems for plaster and like surfaces.

It is known that oleoresinous paints and enamels do not peel to such an extent as lacquers when applied to architectural surfaces, so they have been tried as undercoats for the lacquers. The result, however, has been no better than with lacquer alone. In this case there is an added tendency toward "lifting" during application, i.e., the paint film is swelled and an imperfect, wrinkled, or blistered film results. Glue size and glue paints have also been tried but without marked success.

The casein-containing water paints, on the other hand, have shown more promise of success. These paints comprise a solution of casein and a hardening agent to which pigments, extenders, etc. are added. The usual pigments employed are whiting, or precipitated calcium carbonate, zinc oxide, lithopone, and smaller amounts of other pigments such as titanium dioxide. Various hardening agents such as hexamethylenetetramine, aldehyde, ammonia, paraformaldehyde, etc. have been used to some extent, but lime is almost universally employed in modern casein paints. Other materials such as clay or asbestine which serve as fillers, dry colors for tinting, materials such as sodium silicate which serve to harden the film and materials such as zinc sulphate which act as preservatives are also employed in these paints. The paints are usually marketed in the form of a dry powder but may also be obtained in the form of a paste or a liquid. Although the relative proportions of pigment and filler and the less important ingredients of the paints will be found to vary to a considerable extent, the proportions of lime and casein are found to be quite constant. These may best be judged by the Army and Navy specifications for cold water paints which require a casein content of 10 to 12% by weight and a lime content of 5 to 10% by weight, based on the total weight of the dry paint.

These paints have been found to be satisfactory from the standpoint of good adherence to the plaster and good adherence of the lacquer to the undercoat. However, they have had the serious disadvantage of giving rise to "suction" or "sinking". This is due to the porosity of the plaster and to the porosity of the film of the casein paint as well. On brushing lacquer over bare plaster or over plaster coated with an ordinary casein paint, the first coat will be found to sink into the surface. This causes the production of an uneven finish on the application of the second coat. Portions of the surface will be found to have good gloss and other portions to be quite flat. This, of course, necessitates the application of a third coat of lacquer which greatly increases the cost of the finish.

The surprising discovery has now been made that by increasing, even to a small extent, the casein content of the commercial casein paints, they become eminently suited for undercoatings for brushing lacquer systems. It has been found that if the casein content of the paint film upon which the lacquer is applied be increased to 15% or above, all difficulties due to sinking or suction will be avoided. The casein content may be increased to 40 or 50%, and in some cases a coating consisting of only casein and hardening agent will be found to be satisfactory, especially if applied in a very thin coat. However, in most cases, from 20 to 35% casein, based on the dry weight of the paint, will be found to be most satisfactory. Two coats of lacquer applied over such an undercoat will give a perfectly uniform surface and in many cases, especially if the lacquer is the same color as the undercoat, a single coat will be found to be satisfactory.

The invention may be carried out in a number of different ways. For example, a casein paint may be formulated which contains the necessary proportion of casein. In this case the paint may be made according to the known methods and using the known materials, the only difference being the increased concentration of casein and the corresponding increased concentration of lime.

Another method is to add the necessary increment of casein and lime to the commercial casein paints. In the case of paints marketed in the form of a dry powder the casein and lime may be thoroughly mixed with the powder prior to adding water. In the case of paints marketed in the paste form, however, the added casein should preferably be ground into the paste, and the lime suspended in the water with which the paste is diluted.

A third method is to apply to the surface a coat of a commercial casein paint and subsequently apply a coat of size which contains a high proportion of casein.

The brushing lacquers to be applied over such undercoats may be any of the known types of brushing lacquers, but preferably are those containing hydrocarbon diluents and high boiling solvents such as butyl lactate, amyl lactate, butyl cellosolve, amyl cellosolve, etc.

The invention may best be illustrated by the following specific examples:

Example I

Undercoating

| | Parts by weight |
|---|---|
| Casein | 22 |
| Lime | 10 |
| Calcium carbonate | 58 |
| Titanium dioxide | 10 |

Incorporated in sufficient water to obtain a good brushing consistency.

Lacquer coat

| | Parts by weight |
|---|---|
| Nitrocellulose | 12 |
| Dammar | 10 |
| Dibutyl phthalate | 8 |
| Titanium dioxide | 30 |

Incorporated in 100 parts of a solvent mixture comprising:

| | Parts by volume |
|---|---|
| Normal butyl lactate | 41 |
| Petroleum distillate (boiling range 150–200° C.) | 59 |

Example II

Undercoating

| | Parts by weight |
|---|---|
| Casein paint containing less than 15% casein ("Texolite", "Zemcolite", "Graftex", etc.) | 85 |
| Casein | 10 |
| Lime | 5 |

Incorporated in sufficient water to obtain a good brushing consistency.

Lacquer coat

| | Parts by weight |
|---|---|
| Nitrocellulose | 12 |
| Ester gum | 5 |
| Dammar | 5 |
| Tricresyl phosphate | 8 |
| Titanium dioxide | 10 |
| Prussian blue | 2 |

Incorporated in 100 parts of a solvent mixture comprising:

| | Parts by volume |
|---|---|
| Butyl cellosolve | 45 |
| Petroleum distillate (boiling range 135–185° C.) | 55 |

Example III

Undercoating

| | Parts by weight |
|---|---|
| Casein | 28 |
| Lime | 12 |
| Calcium carbonate | 50 |
| China clay | 5 |
| Titanium dioxide | 5 |

Incorporated in sufficient water to obtain a good brushing consistency.

Lacquer coat

| | Parts by weight |
|---|---|
| Nitrocellulose | 12 |
| Glyptal resin ("rezyl 12") | 20 |
| Dibutyl phthalate | 3 |
| Titanium dioxide | 30 |

Incorporated in 100 parts of a solvent mixture comprising:

| | Parts by volume |
|---|---|
| Secondary butyl lactate | 42 |
| Petroleum distillate (boiling range 135–185° C.) | 53 |
| Turpentine | 5 |

Example IV

Undercoating

Casein paint containing less than 15% casein ("Texolite", "Zemcolite", "Graftex", etc.) incorporated in sufficient water to obtain a good brushing consistency.

Size coat

| | Parts by weight |
|---|---|
| Casein | 65 |
| Lime | 35 |

The casein is soaked in water, 3 parts by weight, the lime is ground in water, 2 parts by weight and the two solutions are then mixed and sufficient water added to obtain a good brushing consistency.

Lacquer coat

| | Parts by weight |
|---|---|
| Nitrocellulose | 12 |
| Ester gum | 5 |
| Dammar | 5 |
| Dibutyl phthalate | 8 |
| Titanium dioxide | 20 |
| Zinc oxide | 10 |

Incorporated in 100 parts of a solvent mixture comprising:

| | Parts by volume |
|---|---|
| Normal butyl lactate | 31 |
| Normal butyl alcohol | 10 |
| Petroleum distillate (boiling range 140–190° C.) | 59 |

It is to be understood that the present invention is not to be limited to the particular compounds or procedure specified above. Compounds which are known to those skilled in the art to be equivalents of those specified and modifications of the procedure which would naturally occur to one skilled in the art may be employed without departing from the spirit of the invention.

The invention now having been described, what is claimed is:

1. A method for finishing bare plaster or like surfaces which comprises applying at least one coat of a casein-containing undercoating, the last coat of said undercoating containing at least 15% of casein, and subsequently applying to said undercoating at least one coat of brushing lacquer.

2. A method for finishing bare plaster or like surfaces which comprises applying at least one coat of a casein-containing undercoating, the last coat of said undercoating containing 20 to 35% of casein, and subsequently applying to said undercoating at least one coat of brushing lacquer.

3. A method for finishing bare plaster surfaces which comprises applying an undercoat comprising casein paint which contains at least 15% of casein, and subsequently applying to said undercoating at least one coat of brushing lacquer.

4. A method for finishing bare plaster surfaces which comprises applying an undercoat comprising casein paint containing 20 to 35% of casein, and subsequently applying to said undercoating at least one coat of brushing lacquer.

5. A method for finishing bare plaster surfaces which comprises applying an undercoat comprising casein paint which contains at least 15% of casein, and subsequently applying to said undercoating at least one coat of brushing lacquer, the major liquid constituents of said brushing lacquer comprising butyl lactate and petroleum hydrocarbons.

6. A finishing system comprising a bare plaster or like base having adhering thereto at least one coat of a casein-containing undercoating, the last coat of said undercoating containing at least 15% casein, and said undercoating having adhering thereto at least one coat of a nitrocellulose brushing lacquer.

7. A finishing system comprising a bare plaster or like base having adhering thereto at least one coat of a casein-containing undercoating, the last coat of said undercoating containing 20-35% of casein, and said undercoating having adhering thereto at least one coat of a nitrocellulose brushing lacquer.

8. A finishing system comprising a bare plaster base having adhering thereto an undercoat comprising casein paint which contains at least 15% of casein, and said undercoating having adhering thereto at least one coat of a nitrocellulose brushing lacquer.

9. A finishing system comprising a bare plaster base having adhering thereto an undercoat comprising casein paint which contains 20-35% of casein, and said undercoating having adhering thereto at least one coat of a nitrocellulose brushing lacquer.

CHARLES BOGIN.